United States Patent
Uchida

[19]

[11] Patent Number: 6,091,839
[45] Date of Patent: *Jul. 18, 2000

[54] FINGERPRINT CHARACTERISTIC EXTRACTION APPARATUS AS WELL AS FINGERPRINT CLASSIFICATION APPARATUS AND FINGERPRINT VERIFICATION APPARATUS FOR USE WITH FINGERPRINT CHARACTERISTIC EXTRACTION APPARATUS

[75] Inventor: Kaoru Uchida, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/768,665

[22] Filed: Dec. 18, 1996

[30] Foreign Application Priority Data

Dec. 22, 1995 [JP] Japan ..................................... 7-335513

[51] Int. Cl.$^7$ ..................................................... G06K 9/00
[52] U.S. Cl. ............................................. 382/125; 382/116
[58] Field of Search ..................................... 382/115, 100, 382/124, 125, 209, 218, 199, 316, 126, 127; 356/71; 235/380, 382, 487, 492

[56] References Cited

U.S. PATENT DOCUMENTS

| 4,607,384 | 8/1986 | Brooks | 382/124 |
|---|---|---|---|
| 5,180,901 | 1/1993 | Hiramatsu | 235/380 |
| 5,267,324 | 11/1993 | Kumagai | 382/124 |
| 5,337,369 | 8/1994 | Shibuya | 382/125 |

FOREIGN PATENT DOCUMENTS

| 52-97299 | 8/1977 | Japan | A61B 5/10 |
|---|---|---|---|
| 59-142676 | 8/1984 | Japan | G06K 9/00 |
| 63-13226 | 3/1988 | Japan | G06F 15/62 |
| 63-34508 | 7/1988 | Japan | G06K 9/00 |
| 5-108806 | 4/1993 | Japan | G06F 15/62 |
| 6309444 | 11/1994 | Japan | G06F 15/62 |

OTHER PUBLICATIONS

Finger Image Identification Method for Personal Verification, Takeda et al., IEEE, pp. 761–766, May 1990.

Takeda, M., et al., "Finger image identification method of personal verification", *Proceedings, 10th International Conference on Pattern Recognition*, Jun. 1990, pp. 761–766, vol. 1.

Stock, R.M., "Automatic fingerprint reader", *Proc. of the Carnahan Conf. on Electronics Crime Countermeasures*, Apr. 19, 1972, pp. 16–28.

Wei–Chung Lin, et al., "A review of ridge counting in dermatoglyphics", Section "3.2 Ridge Counting", Pattern Recognition, 1983, vol. 16, No. 1, pp. 1–8.

(List continued on next page.)

*Primary Examiner*—Jose L. Couso
*Assistant Examiner*—Duy M. Dang
*Attorney, Agent, or Firm*—Ostrolenk, Faber, Gerb & Soffen, LLP

[57] ABSTRACT

The invention provides a fingerprint characteristic extraction apparatus wherein classification and preselection processing with an augmented degree of accuracy can be achieved without significantly increasing the processing time. The apparatus uses, in addition to characteristic amounts used in ordinary preselection processing, another characteristic amount obtained from a fingerprint image for the preselection processing. The apparatus includes a ridge extraction section for extracting ridges from an inputted fingerprint image, a singular point detection section for detecting singular points from the ridges, a main pattern discrimination section for discriminating a pattern of the inputted fingerprint image, and a singular point characteristic calculation section for detecting characteristic amounts between the singular points. The apparatus further includes a joint line extraction section for extracting a joint line from the inputted fingerprint image, and a joint line characteristic calculation section for calculating joint line singular point characteristic amounts from the joint lines, the ridges and the singular points.

14 Claims, 11 Drawing Sheets

OTHER PUBLICATIONS

O. Nakamura, et al., "Fingerprint Classification by Directional Distribution Patterns", The Journal of Treatises of the Electronic Communications Society of Japan, vol. J65–D, No. 10, Oct. 1982, pp. 1286–1293.

S. Ito, et al., "An Algorithm for Classification of Fingerprints Based on the Core", the Transactions of the Institute of Electronics, Information and Communication Engineers of Japan D–II, vol. J73–D–II, No. 10, Oct. 1990, pp. 1733–1741.

K. Asai, et al., "Automated Fingerprint Identification by Minutia–Network Feature—Feature Extraction Processes", the Transactions of the Institute of Electronics, Information and Communication Engineers of Japan D–II, vol. J72–D–II, No. 5, May 1989, pp. 724–732.

"Spider User's Manual", the Industrial Engineering Office of Japan, Kyodo System Development, pp. 500–507, Apr. 1982.

FINGERPRINT CHARACTERISTIC EXTRACTION APPARATUS AS WELL AS FINGERPRINT CLASSIFICATION APPARATUS AND FINGERPRINT VERIFICATION APPARATUS FOR USE WITH FINGERPRINT CHARACTERISTIC EXTRACTION APPARATUS

BACKGROUND OF THE INVENTION

1. Field of the Invention

This invention relates to a fingerprint characteristic extraction apparatus, and more particularly to a fingerprint characteristic extraction apparatus which extracts characteristics of a fingerprint to be used for classification and verification of the fingerprint as well as a fingerprint classification apparatus and a fingerprint verification apparatus for use with the fingerprint characteristic extraction apparatus.

2. Description of the Related Art

Various fingerprint identification apparatus wherein an inputted fingerprint pattern is searched out and identified from within a large number of fingerprint patterns registered in a data base are known, and a well known one of the fingerprint identification apparatus identifies a fingerprint pattern making use of characteristic points of the fingerprint. A fingerprint identification apparatus of the type just mentioned is disclosed, for example, in Japanese Patent Publication Application No. Showa 63-13226 or 63-34508.

It is examined here to effect, using such a fingerprint identification apparatus as described above, identification to detect regarding a search fingerprint card (hereinafter referred to as search side card) having fingerprint impressions for the 10 fingers collected from a certain person whether or not M registered fingerprint cards (hereinafter referred to as file side cards) include a search fingerprint card having fingerprint impressions for the 10 fingers collected from the same person on another opportunity.

In practical use, identification based on a plurality of fingers is performed in order to assure a higher degree of identification accuracy. Since the number of file side cards is large, in order to assure high speed processing of the file side cards, another apparatus has been proposed wherein characteristics of general patterns of fingerprints are extracted from images of fingers of a search side card and file side cards and compared with each other to select those file side cards which have similar characteristics to those of the search side card and verification processing is performed with the selected file side cards while those file side cards which are not similar are determined that they do not coincide with the search side card and the verification processing is not performed for them. It is to be noted that, of the processing operations mentioned, the processing operation for determination of whether the fingerprints of the search side card and a file side card have sufficient approximation to be subject to verification processing is called classification processing, and the processing operation for selective determination of a group of cards for which verification processing should be performed from among the file side cards is called preselection processing.

Characteristics of patterns used for such preselection processing are classified, according to a classification method (main classification), into three large general groups of patterns of loop, whorl and arch based on a general pattern shape of a ridge pattern and a positional relationship of characteristic points. This method is disclosed, for example, in Osamu Nakamura, "Fingerprint Classification by Directional Distribution Patterns", The Journal of Treatises of the Electronic Communications Society of Japan, Vol. J65-D, No. 10, October, 1982, pp.1,286–1,293, Shinichiro Itoh et al., "An Algorithm for Classification of Fingerprints Based on the Core", the Transactions of the Institute of Electronics, Information, and Communication Engineers of Japan D-II, Vol. J73-D-II, NO. 10, October, 1990, pp.1,733–1,741 or "The Science of Fingerprints", U.S. Department of Justice, Federal Bureau of Investigation. Further, in order to effect further accurate preselection processing, a further method is available wherein, as disclosed in "The Science of Fingerprints", patterns are classified based on a combination of information which includes not only main classification information of each finger but also sub information such as a distance between singular points (a core point and a delta point) on the fingerprint, a ridge count and so forth.

In the classification and preselection processing wherein a fingerprint pattern having characteristics similar to those of a particular fingerprint pattern is searched from among a large number of registered fingerprint patterns, it is desirable to extract a number of characteristics as large as possible from a fingerprint image and utilize a characteristic space as wide as possible in order to achieve a higher classification performance.

SUMMARY OF THE PRESENT INVENTION

It is an object of the present invention to provide a fingerprint characteristic extraction apparatus as well as a fingerprint classification apparatus and a fingerprint verification apparatus for use with the fingerprint characteristic extraction apparatus wherein classification and preselection processing with an augmented degree of accuracy can be achieved without increasing the processing time.

In order to achieve the object described above, according to the present invention, in addition to characteristic amounts used in ordinary preselection processing, a novel characteristic amount obtained from a fingerprint image is used for the preselection processing.

In order to attain the object described above, according to an aspect of the present invention, there is provided a fingerprint characteristic extraction apparatus for extracting a characteristic from a fingerprint image inputted thereto, comprising joint line extraction means for detecting a position of a joint line from the inputted fingerprint image, singular point detection means for detecting a position of a singular point from the fingerprint image, and joint line characteristic calculation means for calculating a characteristic amount from the position of the joint line and the position of the singular point.

The joint line characteristic calculation means may calculate, as the characteristic amount, a distance between the singular point and the joint line. Where the inputted fingerprint image has two singular points, the joint line characteristic calculation means may calculate, as the characteristic amount, an angle formed between a straight line interconnecting the two singular points and the joint line or a distance between feet of perpendiculars drawn from the two singular points to the joint line. Or, the joint line characteristic calculation means may detect a number of ridges crossing with a perpendicular drawn from the singular point to the joint line. The singular point or points may be one or both of a core singular point and a delta singular point. The joint line characteristic calculation means may additionally calculate a confidence of the characteristic amount calculated thereby.

According to another aspect of the present invention, there is provided a fingerprint classification apparatus for discriminating whether or not two fingerprint images inputted thereto are similar to each other, comprising joint line extraction means for extracting positions of joint lines from the inputted fingerprint images, singular point detection means for detecting positions of singular points of fingerprints from the fingerprint images, joint line characteristic calculation means for calculating characteristic amounts from the positions of the joint lines and the positions of the singular points, and fingerprint classification means for discriminating based on the characteristic amounts whether or not the two fingerprint images are similar to each other.

According to a further aspect of the present invention, there is provided a fingerprint card preselection apparatus for selecting, from among a plurality of file side fingerprint cards on which fingerprints are imprinted, those on which fingerprints similar to fingerprints impressed on a search side fingerprint card are impressed, comprising imaging means for acquiring fingerprint images from the file side fingerprint cards and the search side fingerprint card, joint line extraction means for extracting positions of joint lines from the fingerprint images, singular point detection means for detecting positions of singular points of the fingerprints from the fingerprint images, joint line characteristic calculation means for calculating characteristic amounts from the positions of the joint lines and the positions of the singular points, and card selection discrimination means for selecting, based on the characteristic amounts from among the file side fingerprint cards, those on which fingerprints similar to the fingerprints impressed on the search side fingerprint card are impressed.

According to a still further aspect of the present invention, there is provided a fingerprint verification apparatus for discriminating whether or not two fingerprint images inputted thereto originate from fingerprints of a same person, comprising joint line extraction means for detecting positions of joint lines from the inputted fingerprint images, singular point detection means for detecting positions of singular points of fingerprints from the fingerprint images, joint line characteristic calculation means for calculating characteristic amounts from the positions of the joint lines and the positions of the singular points, and fingerprint verification means for discriminating based on the characteristic amounts whether or not the two fingerprint images originate from a same person.

With the fingerprint characteristic extraction apparatus, fingerprint classification apparatus, fingerprint card preselection apparatus and fingerprint verification apparatus of the present invention, since, in addition to characteristics of fingerprint images usually used, a characteristic obtained from a joint line is utilized for classification of fingerprints, preselection of fingerprint cards and verification of fingerprints, the characteristic space is expanded comparing with that where no joint line is used. Consequently, classification, preselection and verification with a higher degree of reliability and selectively can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
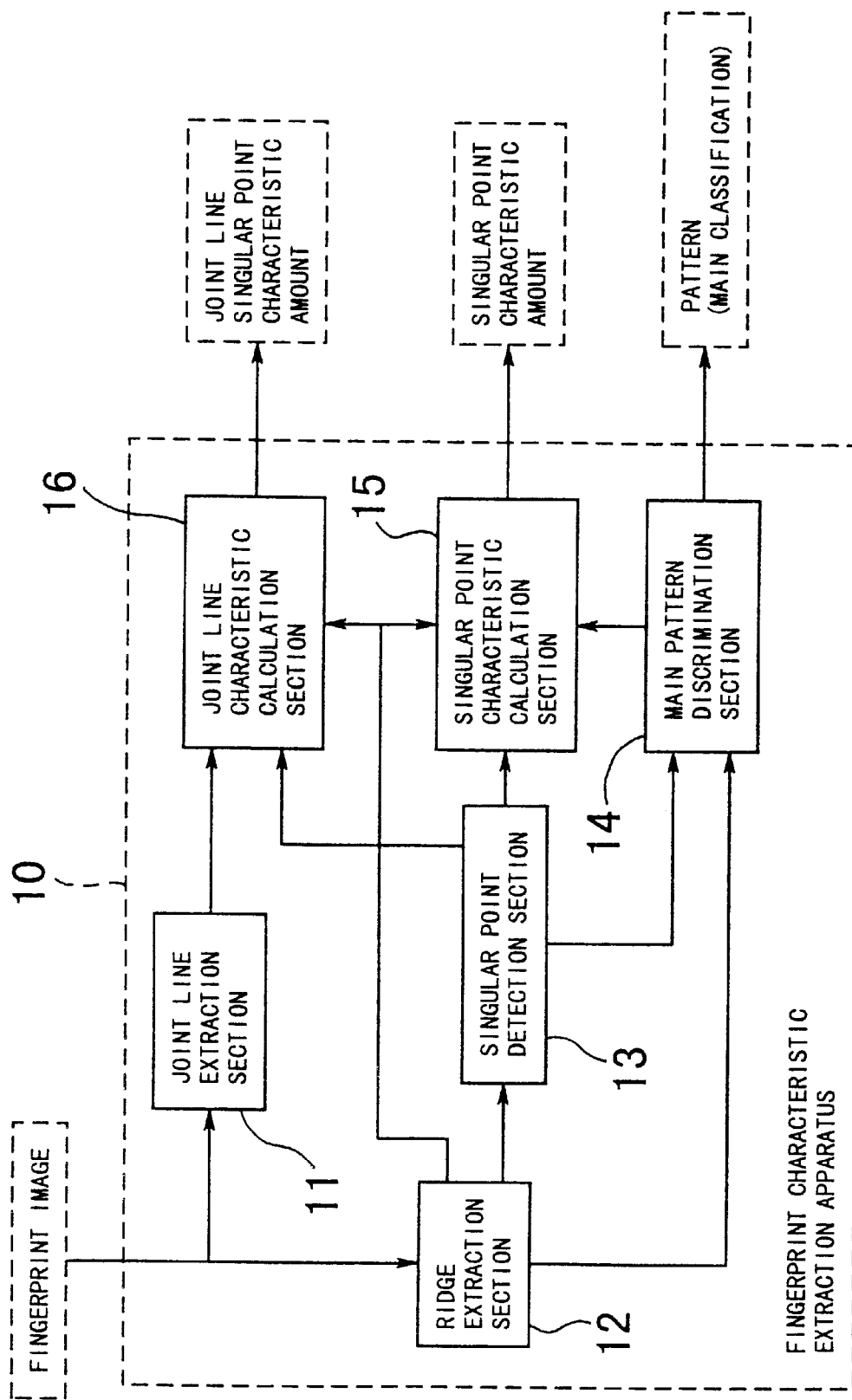
FIG. 1 is a block diagram of a fingerprint characteristic extraction apparatus to which the present invention is applied.

Referring first to FIG. 1, there is shown a fingerprint characteristic extraction apparatus to which the present invention is applied. The fingerprint characteristic extraction apparatus shown is generally denoted at 10 and includes a joint line extraction section 11 for extracting a joint line from a fingerprint image inputted to the fingerprint characteristic extraction apparatus 10, a ridge extraction section 12 for extracting ridges from the inputted fingerprint image, a singular point detection section 13 for detecting singular points from the ridges, a main pattern discrimination section 14 for discriminating a pattern from the ridges and the singular points, a singular point characteristic calculation section 15 for detecting characteristic amounts between the singular points from the ridges, the singular points and the pattern, and a joint line characteristic calculation section 16 for calculating joint line singular point characteristic amounts from the joint lines, the ridges and the singular points.

The joint line extraction section 11 detects and determines a position and a direction of a first nodal line (hereinafter referred to as joint line) included in a fingerprint image (digital image) inputted thereto. The detection of the joint line is performed by estimating a region which may possibly form a joint line from an inputted digital image of a fingerprint and describing a linear line approximating the region.

More particularly, if it is assumed that the fingerprint image is impressed substantially along the direction of the Y axis on an X-Y plane, a joint line is a linear region (white region where ridges are represented in black) extending substantially along the X axis and having a certain width. Accordingly, it is considered that, when a density variation in the Y axis direction is examined, a region in which the density exhibits locally low values and which extends linearly substantially along the X axis is a joint line. Therefore, the fingerprint image is divided into a plurality of strip-like regions elongated in the Y axis direction, and projection histograms in the X axis direction are detected for the individual regions, and then information of the position, width, depth and so forth of each valley portion of each of the detected projection histograms is detected. Then, from the information thus detected, regions which are substantially equal in width and depth and extend along the X axis are extracted, and the regions are approximated with a linear line, which is determined as a joint line.

Figure 2:
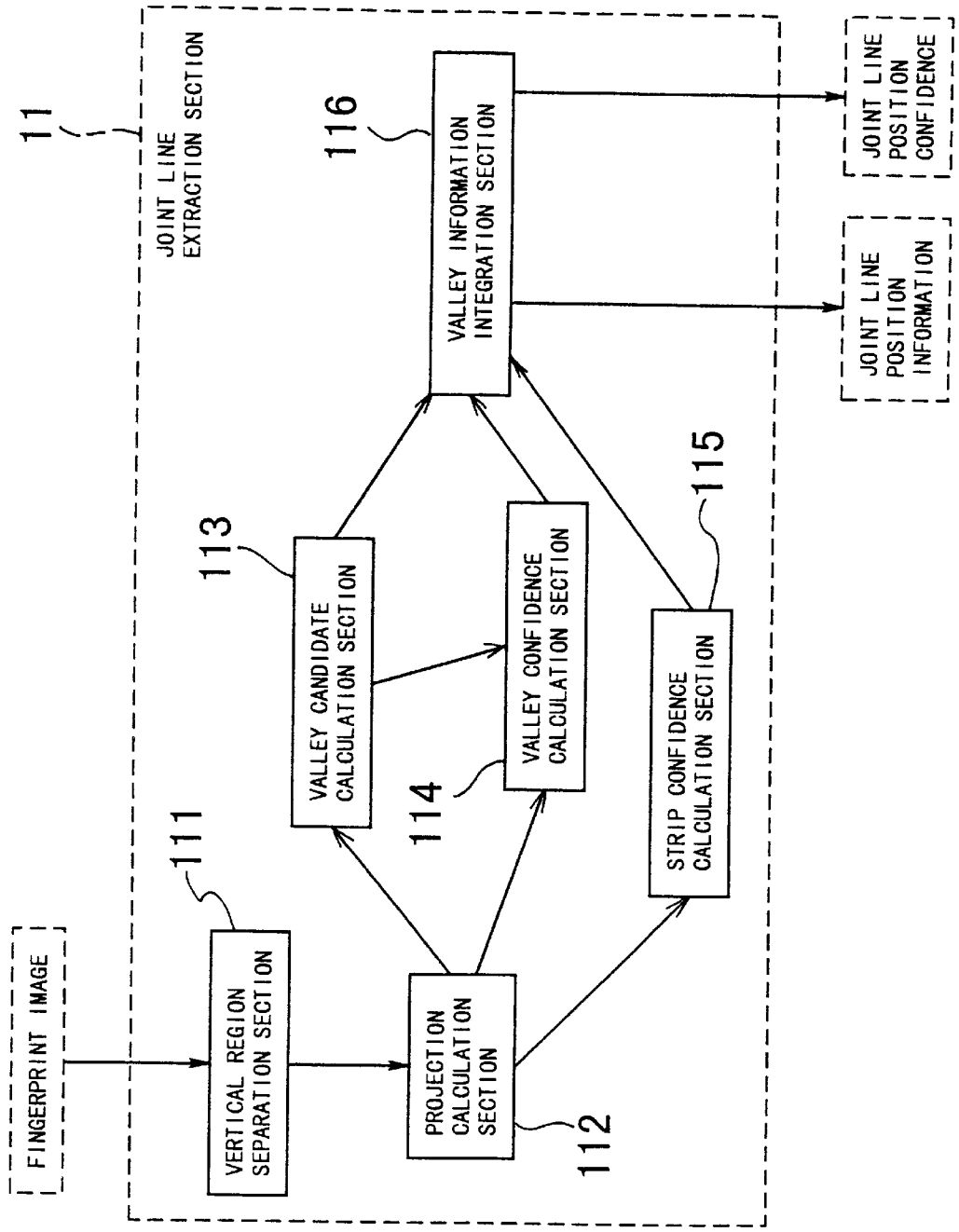
FIG. 2 is a block diagram showing a detailed construction of a joint line extraction section shown in FIG. 1.

FIG. 2 shows an example of detailed construction of the joint line extraction section 11 which extracts a joint line using the method just described. Referring to FIG. 2, the joint line extraction section 11 includes a vertical region separation section 111, a projection calculation section 112, a valley candidate calculation section 113, a valley confidence calculation section 114, a strip confidence calculation section 115 and a valley information integration section 116.

When a fingerprint image is inputted to the joint line extraction section 11, the vertical region separation section 111 divides the fingerprint image with a plurality of perpendicular parallel lines into small rectangular regions which are elongated in the vertical direction and located adjacent each other. Each of the rectangular regions is hereinafter referred to as "strip".

The projection calculation section 112 smoothes each of the strips using a low-pass filter such as, for example, a smoothing filter for the vertical (Y) direction. The smoothing is performed in order to eliminate an influence of horizontal ridge lines in detecting a low density region from a projection histogram as hereinafter described making use of the fact that the density variation of a ridge line is normally smaller than the width of a joint line. Where the window size of the filter is represented by 2L+1, a smoothed image g(x, y) is obtained, for example, based on the following expression (1):

$$g(x, y) = \frac{1}{2L+1} \sum_{l=-L}^{L} f(x, y+1) \quad (1)$$

After the smoothing, horizontal projections are calculated for each of the strips in accordance with the following expression (2):

$$h_m(y) = \sum_{i=0}^{W-1} g(mW+i, y) \quad (0 \leq m < N_h) \quad (2)$$

where $N_h$ is the number of strips, and $W=X/N_h$ is the width of a strip.

Figure 5:
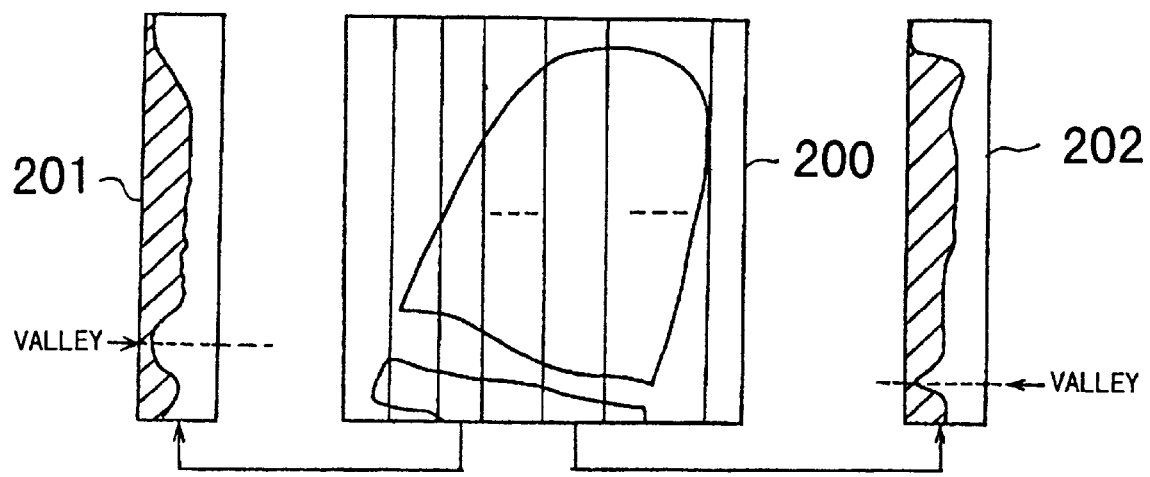
FIG. 5 is a diagrammatic view illustrating processing of a projection calculation section shown in FIG. 2.

The horizontal projections thus obtained form a projection histogram for each $N_h$ strips. FIG. 5 shows a schematic view wherein the processing region is shown separated in parallel strips and two schematic views 201 and 202 wherein projection histograms obtained by calculation for different strips are shown.

Since it sometimes occurs that the quality of an image is not ideal and a joint line is inclined, a projection result does not necessarily exhibit the value 0 in density even on the joint line. There, however, it locally exhibits a lower density than portions above and below the joint line. The valley candidate calculation section 113 searches for candidate points for a white region (valley of a histogram) from the projection result.

Figure 3:
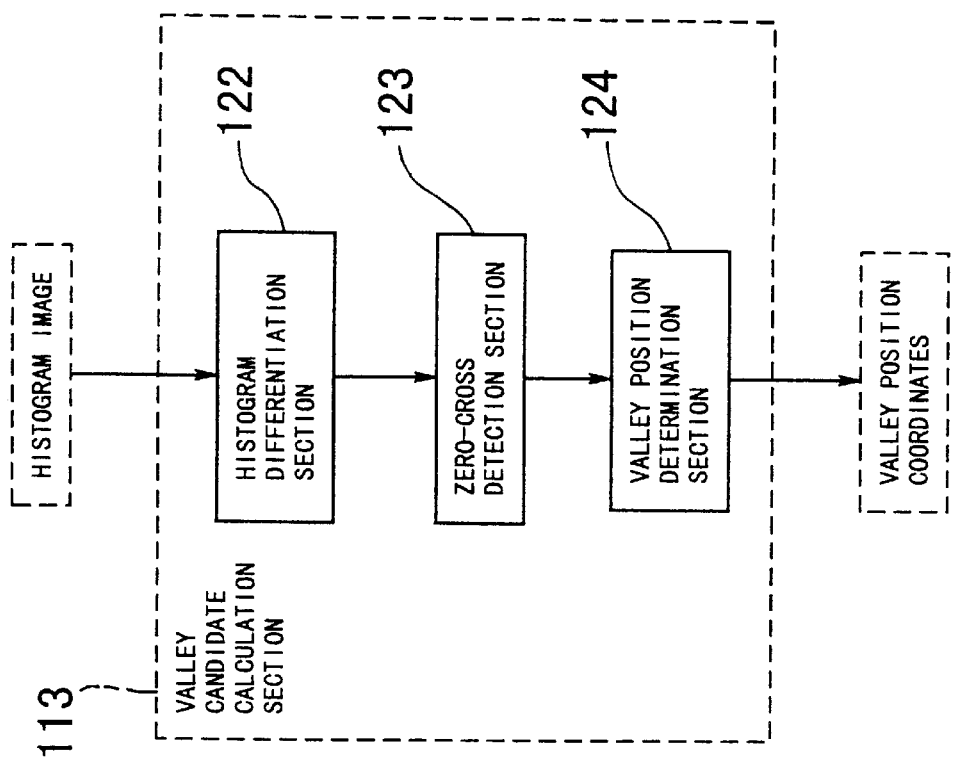
FIG. 3 is a block diagram showing a detailed construction of a valley candidate calculation section shown in FIG. 2.

FIG. 3 shows a construction of the valley candidate calculation section 113. Referring to FIG. 3, a histogram differentiation section 122 scans each of the histograms hm(y) obtained as described above from above to below (in the increasing direction of y) to calculate the differentiation of the histogram, that is, the inclination of the histogram given by $$\frac{d}{dy} h_m(y)$$

A zero-cross detection section 123 detects a zero-cross by a method wherein, based on a variation of the inclination of each histogram between the positive and the negative, 1. a point at which the negative inclination is smaller than $-\epsilon$ ($\epsilon$ is a positive constant of a low value) is determined to be a start point of a valley;
2. another point at which the inclination changes from the negative to the positive crossing 0 is determined to be the bottom of the valley; and
3. a further point at which the inclination becomes, after it exceeds $\epsilon$ once, smaller than $\epsilon$ is determined to be an end of the valley.

Since smoothing has been performed in the preceding processing, a candidate for a valley can be found out stably by such a simple method as described above.

A valley position determination section 124 determines those of the valley candidates found out by the method described above which have a width (difference in y between the start point and the end point of a valley) and a depth (difference between an average value in $h_m(y)$ between the start point and the end point of the valley and $h_m(y)$ of the bottom of the valley) higher than respective corresponding fixed values as "valleys" $P_i$ and outputs position coordinates ($x_i$, $y_i$) of the valleys. For the X coordinate $x_i$, an X coordinate value at the center of each of the strips in the horizontal direction is used, and for the Y coordinate yi, a Y coordinate of the bottom of each of the valleys is used. Each of the strips may possibly have 0 or 1 valley or a plurality of valleys.

The valleys obtained as described above include, in addition to valleys which define a true joint line, many false valleys provided by locally low density regions arising from various factors such as wrinkles, ridge lines, or scars, or blurs, blots or stains inputted in low density. In order to assure accurate selection of correct valleys, the valley confidence calculation section 114 provides, for each of the valleys obtained as described above, a "joint line index" (valley confidence) calculated from the factors including the position, the depth of the valley and the radio between the depth and the width of the valley. For each of the factors, a calculation expression is determined statistically and stochastically from a large number of samples in advance. For example, when correct joint line positions are given manually for a large number of images and then same valley extraction is performed for the images, positions, depths and ratios between the depths and the widths of valleys corresponding to the joint line are calculated, and the index is determined so that it exhibits a high value when the position, depth and ratio have values proximate to peaks of the distributions of them. Consequently, a confidence (confidence rating) $C_i$ is determined for each of the values $P_i$. The confidence has a positive value which increases as the likeliness that the valley may form the joint line increases.

Further, the strip confidence calculation section 115 calculates, as a confidence of each of the strips, a sum of $h_m(y)$ in the Y direction in accordance with the following expression:

$$Dm = \frac{1}{Y}\sum_{y=0}^{Y-1} h_m(y) \qquad (3)$$

The valley information integration section 116 receives the information obtained as described above and calculates joint line position information and, when necessary, a joint line position confidence which is a confidence of the joint line position information.

Figure 4:
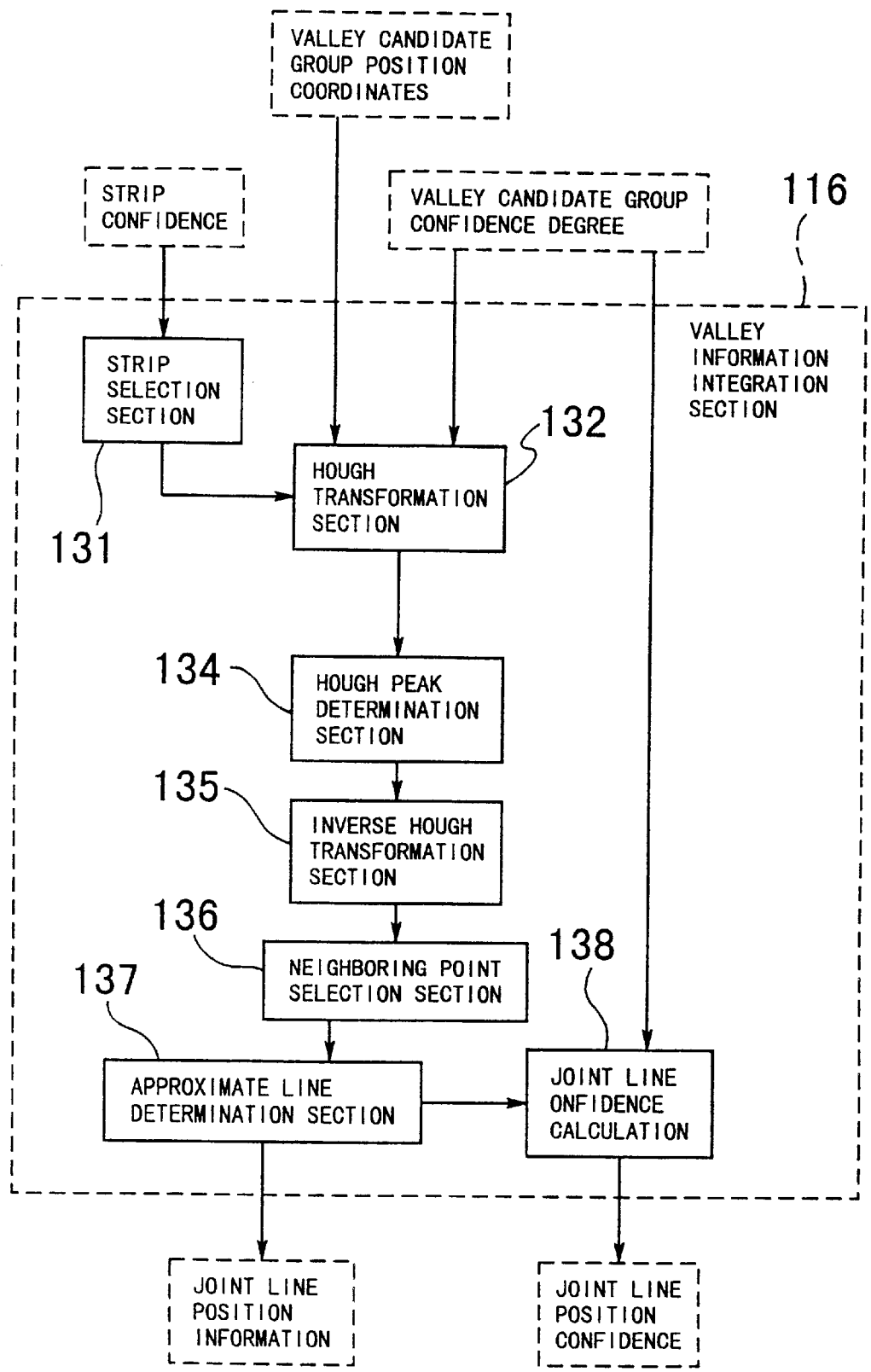
FIG. 4 is a block diagram showing a detailed construction of a valley information integration section shown in FIG. 2.

FIG. 4 shows a detailed construction of the valley information integration section 116. Referring to FIG. 4, a strip selection section 131 selects those strips whose strip confidences $D_m$ are higher than a threshold value. This selection is performed because it is considered that, since a sufficiently high impression quality is not obtained from portions of an original image within a range from the outside of a finger region (the opposite side ends of a frame) to an end of the finger or those strips which do not include a sufficient fingerprint impression therein like strips in the proximity of the opposite sides of the finger (the opposite ends of the processing region) do not have sufficient density information, also the reliability of valley candidates obtained from those regions is low. For the threshold value, for example, an average in density of the overall image is used.

The strip selection section 131 inputs, for each of those valleys $P_i$ present on the strips selected by the strip selection section 131, coordinates $(x_i, y_i)$ and a confidence $C_i$ to a Hough transformation section 132. The Hough transformation section 132 searches for aligned ones of the valley candidates obtained by the Hough transformation in order to find out joint line candidates, which are considered to be arranged on linear lines, from among the valley candidates which may include false valleys. By the Hough transformation, for each of the valley candidates $P_i(x_i, y_i)$, a curved line on an image $H(u, v)$ ($0 \leq u < U$, $0 \leq v < V$) determined by the following mapping equation (4):

$$\frac{u}{V} = x_i \cos\left(\pi \frac{u}{U}\right) + y_i \sin\left(\frac{u}{U}\right) \qquad (4)$$

is calculated, and for each point through which the curve passes, the pixel value (initialized to 0 in advance) is incremented on the Hough space uv. Here, instead of incrementing the pixel values of the Hough space image $H(u, v)$ by one as in ordinary Hough transformation, they are incremented by values which increase in proportion to the confidences $C_i$ so that the magnitudes of the confidences $C_i$ of the valley candidates $P_i$ may be reflected. By the transformation described above, points having high intensities appear on the image uv corresponding to alignments of the valley candidates on linear lines, and the density at each of the points represents a convergence strength on the straight line with the confidence of the valley candidate point taken into consideration.

A Hough peak determination section 134 scans all points in the Hough space H to detect a peak point $Q_m = (u_m, v_m)$ from among those points which have high intensity values $H(u, v)$. Those points which have high intensities in the density distribution $H(u, v)$ in the Hough space correspond to a linear array of values in the original image $f(x, y)$.

An inverse Hough transformation section 135 performs inverse Hough transformation of the peak point $Q_m = (u_m, v_m)$ obtained as described above to calculate the inclination and the intercept given by $$A_h = \frac{\cos(\pi u_m / U)}{\sin(\pi u_m / U)}, \qquad B_h = \frac{v_m / V}{\sin(\pi u_m / U)}$$

of a joint line candidate line given by $$y = A_h x + B_h.$$

A neighboring point selection section 136 determines a group of points spaced by a fixed distance from the joint line candidate line $y = A_h x + B_h$ determined by the inverse Hough transformation section 135 as a correct group of points which form a joint line. To this end, the neighboring point selection section 136 selects, from among the group of valleys on the strips selected by the strip selection section 131, only those valleys whose coordinates $(x_i, y_i)$ satisfy, with regard to a low positive fixed threshold value $\delta$, the following expression:

$$A_h x_i + B_h - \delta < y_i < A_h x_i + B_h + \delta$$

Finally, an approximate line determination section 137 determines, from the coordinates $(x_i, y_i)$ of the valleys selected as described above, a joint line $y = Ax + B$ (the summing is performed for all selected valleys) in the following manner by the least square method:

$$A = \frac{S_{xy} - \bar{x}\bar{y}}{S_{x2} - \bar{x}^2}, \qquad B = \bar{y} - A\bar{x}$$

where $S_{xy} = (\Sigma x_i y_i)/n$, $S_{x2} = (\Sigma x_i^2)/n$, $\bar{x} = (\Sigma x_i)/n$, and $\bar{y} = (\Sigma y_i)/n$.

The processing by the neighboring point selection section 136 and the approximate line determination section 137 has the following meanings. Projected at one point $Q_m$ by the Hough transformation are linear line elements mapped in the proximity of the point $Q_m$ of the Hough image $H(U \times V)$ within rounding errors when the original image $f(x, y)$ having scattered valley points is Hough transformed. However, since an actual joint line is not a complete straight line but sometimes has some curvature on an arc and besides a joint line has some width, the valley points do not necessarily appear on a linear line. Therefore, valleys which appear in the proximity ($\pm \delta$) of the linear line are selected again, and a liner line which approximates the valleys best is determined by the least square method.

On the other hand, a joint line confidence calculation section 138 calculates an average of the confidences $C_i$ of the valleys $P_i$ selected by the neighboring point selection section 136 and used for the calculation by the approximate line determination section 137, and outputs the thus calculated average as a joint line position confidence C.

When an input image is received, the coefficients A and B which describe the position of a joint line included in the input image and the joint line position confidence C are calculated in such a manner as descried above. For example, where no joint line is included in the input image, this can be determined from the fact that the confidence has a value close to 0, and in this instance, it is determined that the joint line information determined here should not be used.

Referring back to FIG. 1, the ridge extraction section 12 traces a ridge of an inputted fingerprint image and outputs a description of it. In particular, the ridge extraction section 12 binary digitizes the inputted fingerprint image and performs line thinning processing to detect ridges. Further, the ridge extraction section 12 inverts the binary digitized image and performs line thinning processing to detect valley lines. Then, the ridge extraction section 12 outputs descriptions of the detected ridges and valley lines. For the binary digitization of an image by the ridge extraction section 12, an image processing method can be utilized which is disclosed, for example, in Asai et al., "Automated Fingerprint Identification by Minutia-Network Feature—Feature Extraction Processes—", the Transactions of the Institute of Electronics, Information, and Communication Engineers of Japan D-II, Vol. J72-D-II, No. 5, May, 1989, pp.724–732. Further, for the line thinning processing, for example, the Tamura's algorithm can be used which is disclosed, for example, in "SPIDER USER'S MANUAL", the Industrial Engineering Office of Japan, Kyodo System Development.

The singular point detection section 13 detects a core singular point and a delta singular point from the ridge description from the ridge extraction section 12 and determines position coordinates of them. In short, the singular point detection section 13 detects, from the ridge description, an end point of a ridge (branching point of a valley line) and a branching point of the ridge (end point of the valley line), and outputs position coordinates of them. For the singular point detection section 13, a singular point detection apparatus disclosed, for example, in Japanese Patent Laid-Open Application No. Heisei 5-108806 can be used.

The main pattern discrimination section 14 determines a pattern (main class) from the ridge description and the singular point information from the ridge extraction section 12 and the singular point detection section 13, respectively. The pattern can be determined from the number of core singular points or by tracing several characteristic lines surrounding a core singular point.

The singular point characteristic calculation section 15 calculates, based on the singular point information from the singular point detection section 13 and the ridge description from the ridge extraction section 12, singular point characteristic amounts in accordance with the pattern discriminated by the main pattern discrimination section 14. In the following, calculation of singular point characteristic amounts will be described with reference to FIG. 6.

Figure 6:
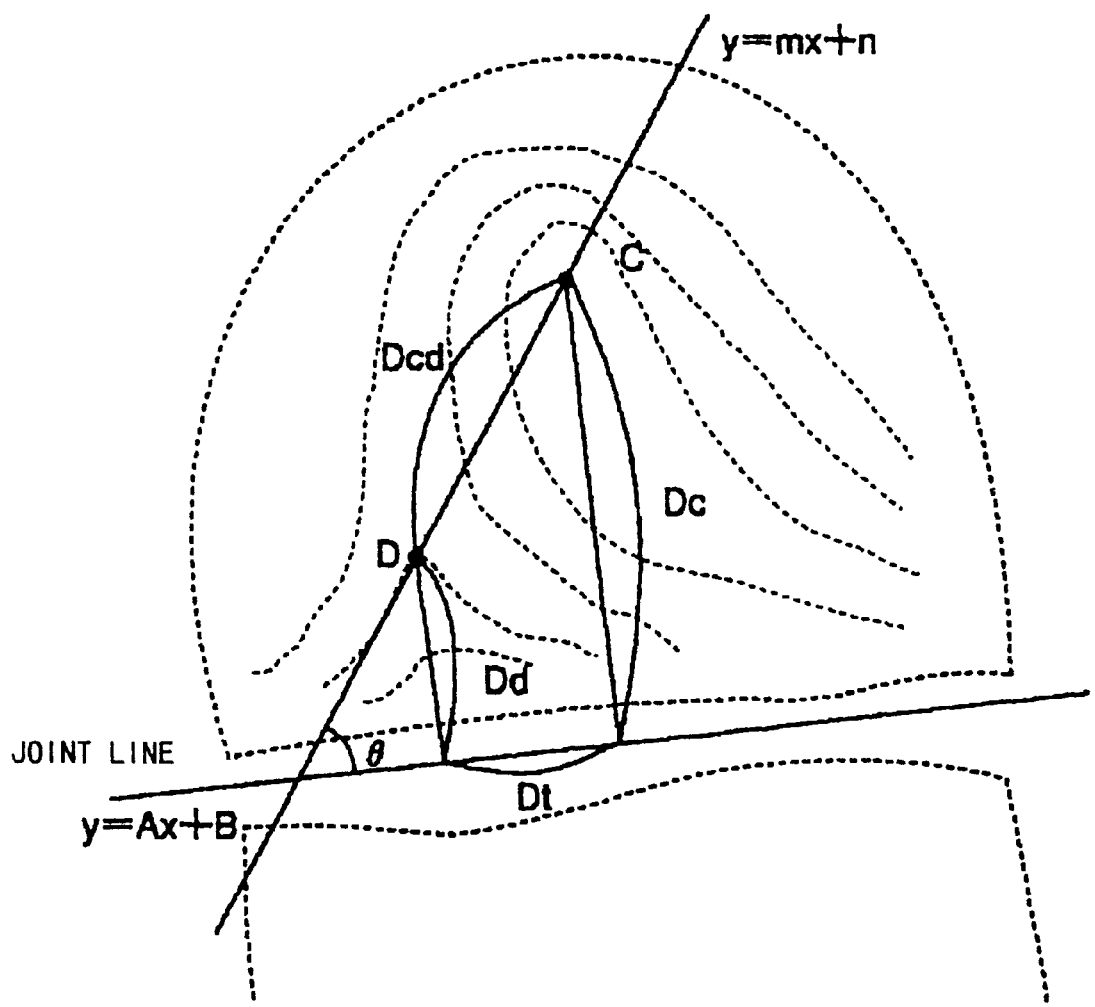
FIG. 6 is a diagrammatic view illustrating operation of a fingerprint characteristic calculation section shown in FIG. 1.

An inputted fingerprint image shown in FIG. 6 exhibits a loop pattern having one core C and one delta D. Here, if the X axis is taken in the leftward and rightward directions while the Y axis is taken in the upward and downward direction in FIG. 6, then the singular point detection section 13 outputs coordinates of the core C and the delta D, that is, $(x_c, y_c)$ and $(x_d, y_d)$. First, the singular point characteristic calculation section 15 calculates a distance between the two points, that is, the core-delta distance (two-point Euclidean distance). The distance $D_{cd}$ is calculated in accordance with $D_{cd}=\sqrt{(x_c-x_d)^2+(y_c-y_d)^2}$. Thereafter, the singular point characteristic calculation section 15 calculates a core-delta intervening crossing ridge number (number of intervening ridges crossing with a line segment which interconnects the two points) from the ridge description from the ridge extraction section 12 and a description of the line segment.

It is to be noted that, while calculation of characteristic amounts when the main class of a fingerprint is a loop is described above, characteristic amounts can be calculated in a similar manner also where the main class of the fingerprint is a tented arch. Meanwhile, where a fingerprint has a whorl pattern, it has two cores and two deltas at the greatest, and in this instance, such characteristic amounts as described above may be calculated for all or some of up to six combinations of the four points.

Further, while, in the calculation described above, both of the core-delta distance and the core-delta intervening crossing ridge number are calculated, only one of them may otherwise be calculated.

The joint line characteristic calculation section 16 calculates joint line singular point characteristic amounts based on the description of the joint line approximate line from the joint line extraction section 11, the singular point position description from the singular point detection section 13 and the ridge description from the ridge extraction section 12. If the joint line is given, for example, as y=Ax+B as seen in FIG. 5, then the joint line characteristic calculation section 16 calculates all or some of a core-joint line distance (length of a perpendicular from the core to the joint line), a delta-joint line distance (length of a perpendicular from the delta to the joint line), a CD line-joint line angle, a core-delta joint line projection point distance (distance between the foot of a perpendicular from the core to the joint line and the foot of another perpendicular from the delta singular point to the joint line), a core-joint line intervening crossing ridge number (number of intervening ridges crossing a perpendicular segment from the core singular point to the joint line) and a delta-joint line intervening crossing ridge number (number of ridges crossing a perpendicular segment from the delta singular point to the joint line).

It is to be noted that the core-joint line distance $D_c$ and the delta-joint line distance $D_d$ are calculated in accordance with the expressions $D_c=|Ax_c-y_c+B|/\sqrt{A^2+1}$ and $D_d=|Ax_d-y_d+B|/\sqrt{A^2+1}$, respectively. Further, the CD line-joint line angle $\theta$ can be calculated, where the expression representing the CD line is y=mx+n, in accordance with $\theta=\tan^{-1}|(m-A)/(1+mA)|$. Incidentally, the CD line is represented by the following expression (5):

$$y - y_c = \frac{y_d - y_c}{x_d - x_c}(x - x_c) \quad (x_c \neq x_d) \qquad (5)$$
$$x = x_c \qquad (x_c = x_d)$$

Further, the core-delta joint line projection point distance $D_t$ can be calculated in accordance with $$D_t = (D_c - D_d)/\tan\theta = |(D_c - D_d)(1 + mA)/(m - A)|$$

or $$D_t = \sqrt{(x_c - x_d)^2 + (y_c - y_d)^2 - (D_c - D_d)^2}.$$

Also the joint line characteristic calculation section 16 can calculate characteristic amounts even where the main class of a fingerprint is a tented arch in a similar manner as in the singular point characteristic calculation section 15. On the other hand, where a fingerprint has a whorl pattern, it has two cores and two deltas at the greatest, and in this instance, such characteristic amounts as described above may be calculated for all or some of up to six combinations of the four points.

As described hereinabove, the fingerprint characteristic extraction apparatus 10 of FIG. 1 outputs a pattern, singular point characteristic amounts and joint line singular point characteristic amounts from the main pattern discrimination section 14, singular point characteristic calculation section 15 and joint line characteristic calculation section 16, respectively.

Subsequently, another fingerprint characteristic extraction apparatus to which the present invention is applied will be described with reference to FIG. 7. The fingerprint characteristic extraction apparatus shown is generally denoted at 30 and includes, similarly to the fingerprint characteristic extraction apparatus 10 described hereinabove with reference to FIG. 1, a joint line extraction section 31, a ridge extraction section 32, a singular point detection section 33, a main pattern discrimination section 34, a singular point characteristic calculation section 35 and a joint line characteristic calculation section 36. The ridge extraction section 32 operates similarly to the ridge extraction section 12 of the fingerprint characteristic extraction apparatus 10 of FIG. 1, but the other elements perform, in addition to the operations similar to those of the fingerprint characteristic extraction apparatus 10 of FIG. 1, operations of producing and outputting confidence information representative of confidences (likeliness degrees) of the outputs of the individual components.

The joint line extraction section 31 detects and determines, similarly as in that of the fingerprint characteristic extraction apparatus 10 of FIG. 1, the position and the direction of a first nodal line (joint line) included in a fingerprint image inputted thereto. Simultaneously, the joint line extraction section 31 outputs joint line confidence information representative of reliabilities (likeliness degrees) of the thus determined position and direction of the joint line.

The joint line confidence information is detected by calculation from factors of a detected valley such as the position, the depth, and the ratio between the depth and the width. The calculation expression to be used here is determined statistically and stochastically from a large number of samples in advance as described hereinabove.

The ridge extraction section 32 traces ridges present on the inputted fingerprint image and outputs a description of them similarly as in the fingerprint characteristic extraction apparatus 10 of FIG. 1.

The singular point detection section 33 detects positions of a core singular point and a delta singular point based on a ridge description of the ridge extraction section 32 and determines coordinate values of them. Simultaneously, the singular point detection section 33 outputs singular point confidence information representative of reliabilities of the detected singular points.

Figure 8:
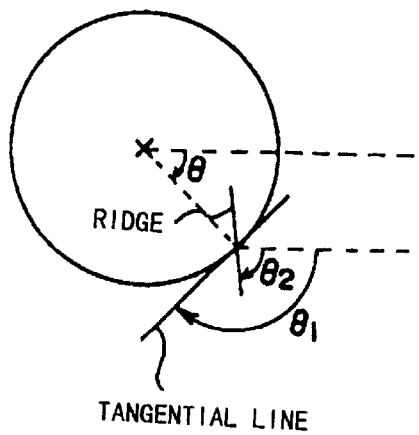
FIG. 8 is a diagrammatic view illustrating a method of detecting singular point confidence information by a singular point detection section shown in FIG. 7.

For example, the following factors may be used as the singular point confidence information. In particular, as seen in FIG. 8, a circle centered at a detected singular point is imagined, and an angle formed between a tangential line at a point on the circle and the horizontal direction is defined as $\theta_1$, another angle formed between the direction of a ridge at the point and the horizontal direction is defined as $\theta_2$, a vector representing the tangential direction is defined as ($R_1$ cos $2\theta_1$, $R_1$ sin $2\theta_1$), and a vector representing the ridge direction is defined as ($R_2$ cos $2\theta_2$, $R_2$ sin $2\theta_2$). Here, $R_1$ and $R_2$ are arbitrary constants, and $\theta_1$ and $\theta_2$ assume values from 0 to $\pi$. The inner product of the two vectors is calculated in accordance with the following expression:

$$R_1R_2(\cos 2\theta_1 \cos 2\theta_2 + \sin 2\theta_1 \sin 2\theta_2) = R_1R_2 \cos 2(\theta_2-\theta_1)$$

Figure 9:
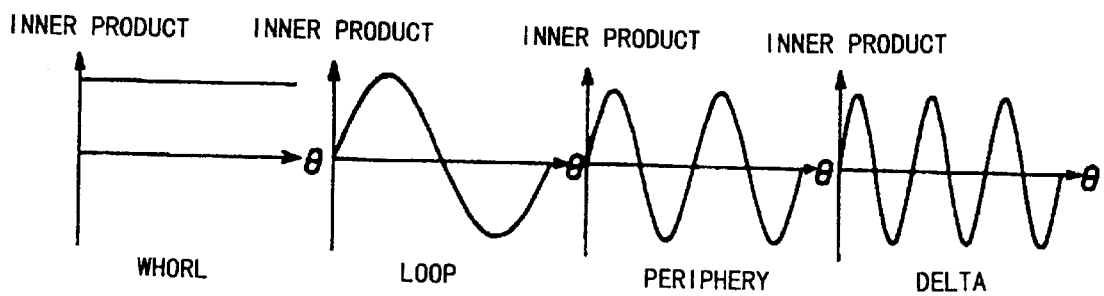
FIG. 9 is a diagram illustrating a method of calculation for the detection illustrated in FIG. 8.

From this expression, it can be seen that, where the tangential direction and the ridge line direction are the same, the inner product of the two vectors exhibits its highest value $R_1R_2$, and where they perpendicularly cross each other, the inner product of the two vectors exhibits its lowest value $-R_1R_2$. Accordingly, if the angle $\theta$ of the circle is employed for the abscissa and the inner product is employed for the ordinate, then different characteristic ridge direction distributions are obtained form a whorl, a loop, a periphery and a delta as seen in FIG. 9. Here, such ridge line direction distribution is represented by f(h). Where m is an integer equal to or higher than 2, h represents an integer from 0 to (m−1). Consequently, $\theta$ is represented by $\theta=2\pi h/m$. This ridge line direction distribution f(h) is sampled at the 0th to (m−1)th points and then discrete Fourier expanded to obtain Fourier series given by the following expressions (6):

$$a_k = \frac{2}{m}\sum_{h=0}^{m-1} f(h)\cos\frac{2\pi kh}{m} \tag{6}$$

$$b_k = \frac{2}{m}\sum_{h=0}^{m-1} f(h)\sin\frac{2\pi kh}{m}$$

From the Fourier series obtained, the intensity of each frequency component k is calculated from $a(k)^2+b(k)^2$. However, where k=0, the intensity is $a(0)^2/4$. Since the intensity for k=0, 1, 2, and 3 exhibits a high value in the proximity of a whorl, a loop, a periphery or a delta, a singular point can be detected by comparing the different values of the intensity.

The ridge line direction distribution in the proximity of a singular line is approximated, using a sine function, to $$f(h)=A(k)\sin(2\pi kh/m+\phi)=A(k)\sin\phi\cos(2\pi kh/m)+A(k)\cos\phi\sin(2\pi kh/m)$$

but the intensity of the frequency component k after Fourier expansion given by $$a(k)^2+b(k)^2=\{A(k)\sin\phi\}^2+\{A(k)\cos\phi\}^2=A(k)^2$$

does not include the phase $\phi$ which represents rotation of the ridge line direction pattern. Accordingly, a result of singular point detection according to the present invention is not influenced by rotation of the ridge line direction pattern.

Referring back to FIG. 7, the main pattern discrimination section 34 determines a pattern based on the ridge information and the singular point information obtained from the ridge extraction section 32 and the singular point detection section 33, respectively, similarly as in the fingerprint characteristic extraction apparatus 10 of FIG. 1. Simultaneously, the main pattern discrimination section 34 outputs also confidence information representative of the determination.

For the confidence information here, a posteriori probability is used. In particular, a correction answer ratio when main pattern discrimination processing is performed for a large number of learning data (fingerprint information) is used as the confidence.

The singular point characteristic calculation section 35 calculates, based on the singular point information and the confidence of it from the singular point detection section 33, singular point characteristic amounts in accordance with the pattern and the confidences of them determined by the main pattern discrimination section 34. For example, for the confidence of the core-delta distance, a product of the confidence of the core singular point and the confidence of the delta singular point is used.

The joint line characteristic calculation section 36 calculates joint line singular point characteristic amounts in a similar manner as in the fingerprint characteristic extraction apparatus 10 of FIG. 1 from the description of the joint line approximate line inputted from the joint line extraction section 31 and the position descriptions of the core singular point and the delta singular point from the singular point detection section 33. Simultaneously, the joint line characteristic calculation section 36 also calculates the confidences of the individual characteristic amounts.

For example, if an inputted fingerprint image has a loop pattern having one core and one delta, the characteristic amounts of them and the confidences are such as follows.

In particular, the confidence of the core-joint line distance=the product of the joint line confidence and the confidence of the core; the confidence of the delta-joint line distance=the product of the joint line confidence and the confidence of the delta; the confidence of the CD line-joint line angle=the product of the joint line confidence, the confidence of the core and the confidence of the delta; the confidence of the core-delta joint line projection point distance=the product of the joint line confidence, the confidence of the core and the confidence of the delta; the confidence of the core-joint line intervening crossing ridge number=the product of the joint line confidence, the confidence of the core, and a ratio in length of a portion of this interval in which ridges are extracted apparently successfully to the interval; and the confidence of the delta-joint line intervening crossing ridge number=the product of the joint line confidence, the confidence of the delta, and a ratio in length of a portion of this interval in which ridges are extracted apparently successfully to the interval.

It is to be noted that, while the foregoing description relates to a fingerprint whose main class is a loop, this similarly applies to other fingerprints whose main classes are a tented arch or a whorl.

The fingerprint characteristic extraction apparatus 30 in the present embodiment outputs, as characteristics of an inputted fingerprint image, a pattern and a confidence of it from the main pattern discrimination section 34, singular point characteristic amounts and confidences of then from the singular point characteristic calculation section 35 and joint line singular point characteristic amounts and confidences of then from the singular point characteristic calculation section 35 in such a manner as described above.

Subsequently, a fingerprint classification apparatus to which the present invention is applied will be described with reference to FIG. 9. The fingerprint classification apparatus is denoted at 40, and performs characteristic extraction for file side fingerprint images and a search side fingerprint image using two such fingerprint characteristic extraction apparatus 10 as described hereinabove with reference to FIG. 1 and then performs classification processing of the fingerprint image based on extracted characteristics by means of a fingerprint classification section 41.

The fingerprint classification section 41 detects differences of characteristic amounts for individual items from characteristic information from the two fingerprint characteristic extraction apparatus 10, and determines values which increase in proportion to the differences as difference degrees in the individual items. Then, the fingerprint classification section 41 adds all of the difference degrees for the individual items obtained to obtain a difference degree between the two images. The fingerprint classification section 41 then compares the difference degree with a predetermined threshold value to effect discrimination whether or not verification processing should thereafter be performed. Then, when the difference degree is equal to or lower than the threshold value, the fingerprint classification section 41 outputs a result of classification of "to be selected", but when the difference degree is higher than the threshold value, the fingerprint classification section 41 outputs another result of classification of "not to be selected".

Where the given file side and search side fingerprint images are collected from the same person, or in other words, where the pair is a mate, the images have a same pattern, and the differences in value of the characteristic amounts are considered to be mere errors arising from a variation of the fingerprint with respect to time, a difference in impression condition, a measurement error and so forth. Accordingly, the difference degree obtained is likely to be lower than the threshold value, and it is determined that the file side fingerprint is "to be selected" in regard to the search side fingerprint. On the contrary, where the file side fingerprint image and the search side fingerprint image are collected from different persons, or in other words, where the pair is a non-mate, either the patterns may be different from each other or the possibility that the differences in characteristic amount may be large is high, and also the difference degree is likely to exhibit a high value. Consequently, the possibility that it may be determined that the search side fingerprint is "not to be selected" is high. Consequently, classification which is high in accuracy and selectivity can be realized.

In this manner, in the fingerprint classification apparatus which includes a fingerprint characteristic extraction apparatus which extracts a joint line, the characteristic space is expanded comparing with that of an ordinary apparatus, and classification which is higher in reliability and selectivity can be achieved. More particularly, a characteristic amount of a characteristic utilized usually such as, for example, a characteristic of the core-delta distance or the core-delta intervening crossing ridge number cannot be detected unless both of a core singular point and a delta singular point are detected. Therefore, if only one of them cannot be detected because, for example, the fingerprint image is low in quality, no characteristic point can be calculated or utilized. For example, where the file side fingerprint has a loop pattern, if the delta from between the core and the delta cannot be detected, then only a characteristic as a main class can be detected. In contrast, with the fingerprint classification apparatus of the present invention, even if one of the core and the delta cannot be detected, since such characteristic amounts as the distance between the other of the core and the delta and the joint line and the number of intervening crossing ridges between the other of the core and the delta and the joint line can be used, the amount of information which can be used for classification is increased, and the classification performance is augmented as much.

In an actual fingerprint classification apparatus, characteristic amounts extracted from file side and search side fingerprints by fingerprint characteristic extraction apparatus are stored into a data storage medium such as a disk or a memory, and the stored characteristic amounts are read out by the fingerprint classification section 41 to effect classification processing. In this instance, since the amount of the data to be stored into the data storage medium is much smaller than the amount of minutiae data of fingerprints necessary for identification, and the storage capacity of the storage apparatus may be very small. Also the amount of calculation by the fingerprint classification apparatus is much smaller than that for identification processing, and consequently, the fingerprint classification operation can be performed at a high speed.

Figure 10:
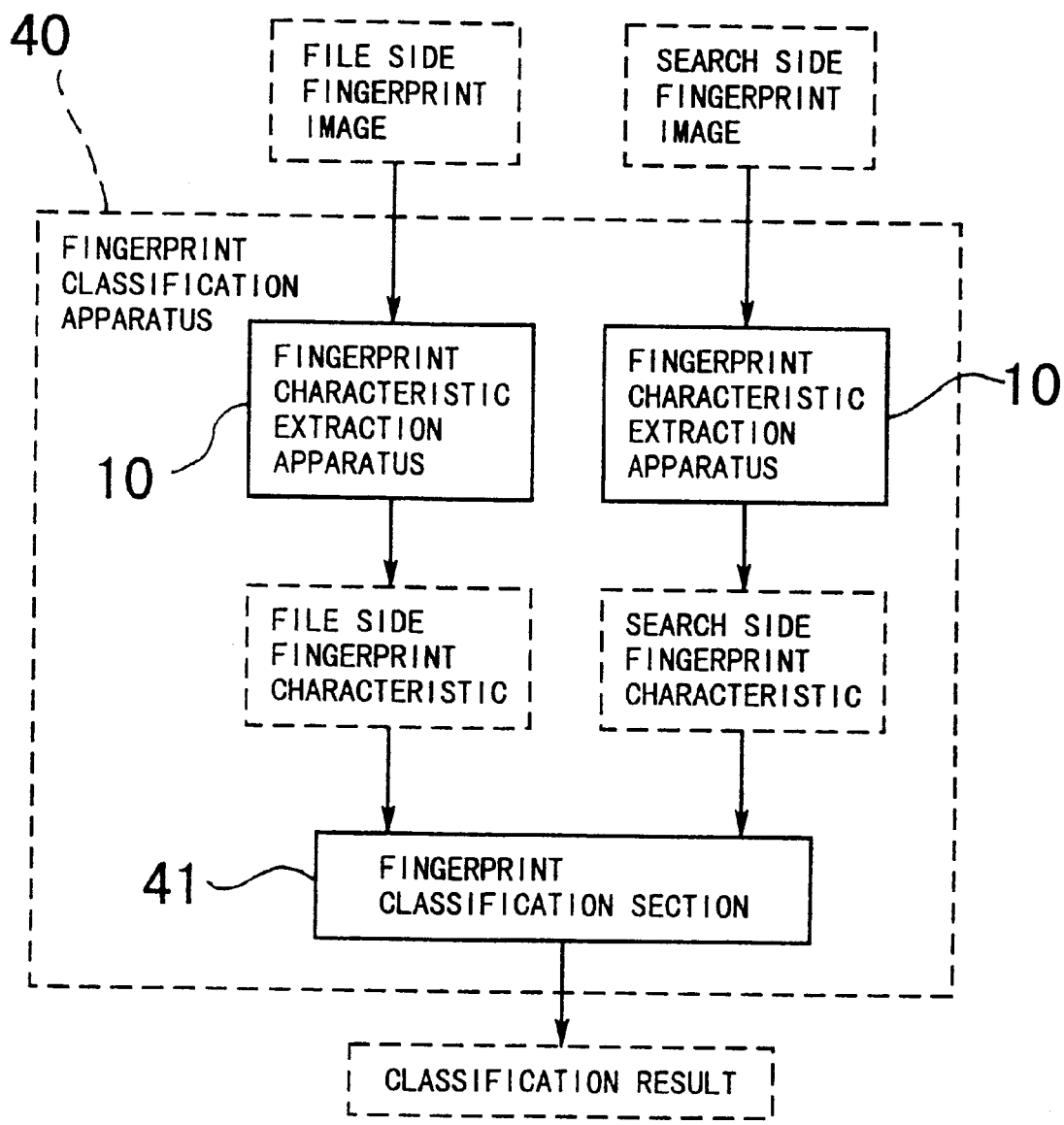
FIG. 10 is a block diagram of a fingerprint classification apparatus to which the present invention is applied.
Figure 11:
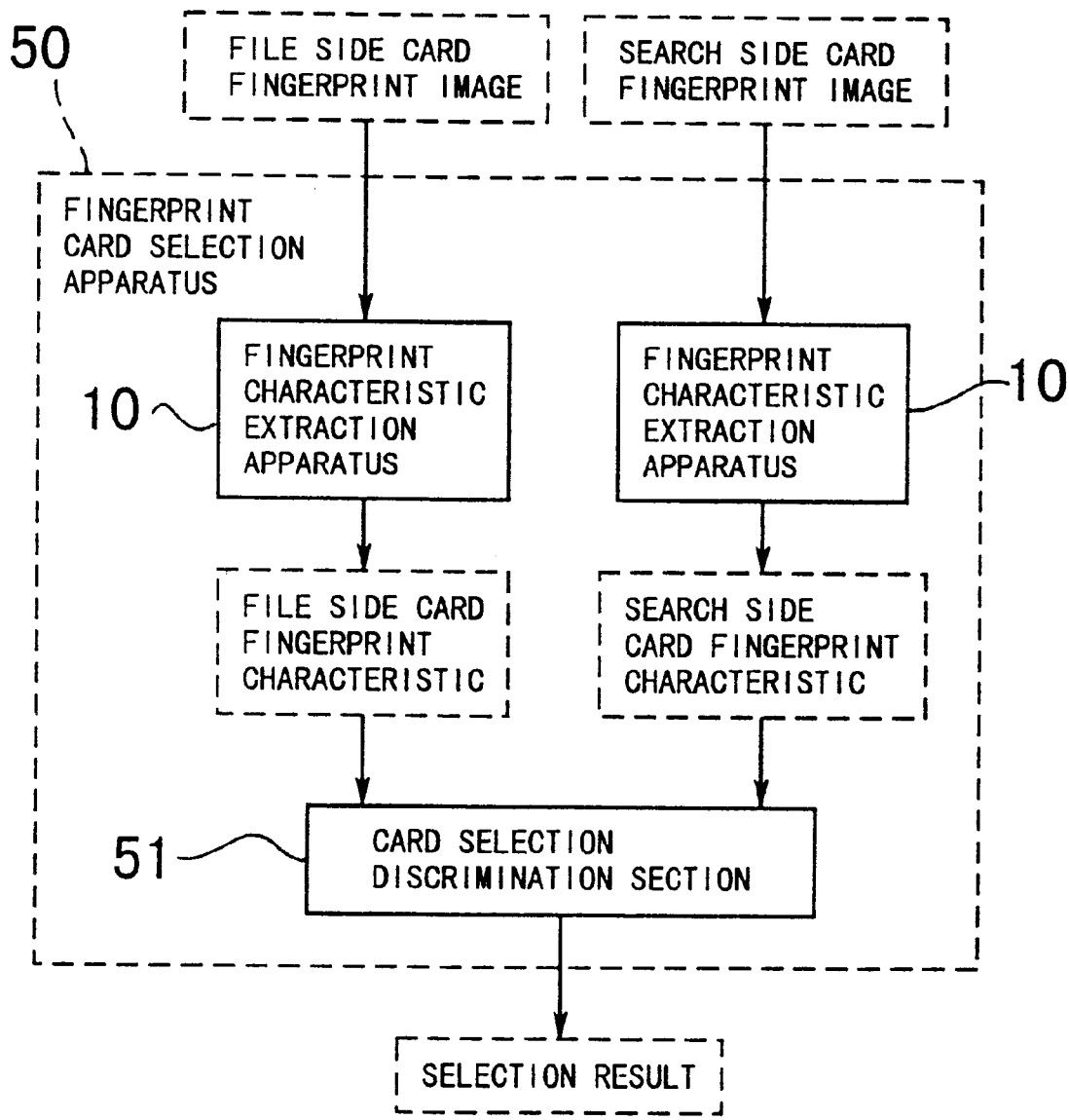
FIG. 11 is a block diagram of a fingerprint card preselection apparatus to which the present invention is applied.

Subsequently, a fingerprint card selection apparatus to which the present invention is applied will be described with reference to FIG. 11. The fingerprint card selection apparatus is generally denoted at 50 and has a basically same construction as but is different from the fingerprint classification apparatus 40 of FIG. 10 in that it includes a card selection discrimination section 51 in place of the fingerprint classification section 41. The fingerprint card selection apparatus 50 is different from the fingerprint classification apparatus 40 also in that characteristic extraction is performed individually from images of fingerprints of ten fingers impressed on a fingerprint card.

Each of the fingerprint characteristic extraction apparatus 10 receives a fingerprint image obtained by imaging a fingerprint imprinted on a fingerprint card. Each of the fingerprint characteristic extraction apparatus 10 extracts characteristics of fingerprints of the individual fingers from the inputted fingerprint image and outputs the characteristics collectively in units of a card (hereinafter referred to as card fingerprint characteristics).

The card selection discrimination section 51 compares the fingerprint characteristics of the inputted card to detect difference degrees weighted for individual items and then sums the difference degrees similarly to the fingerprint classification section 41. In particular, the card selection discrimination section 51 calculates differences of characteristic amounts extracted with regard to the individual fingers for the individual items and weights them to obtain difference degrees, and calculates the sum total of the difference degrees. Then, the card selection discrimination section 51 compares the thus obtained difference degree sum with a predetermined threshold value to determine whether the file side card is to be selected or not to be selected. Thereafter, the card selection discrimination section 51 successively performs characteristic extraction of file side cards, calculates difference degrees of them from those of the search side card and performs preselection processing.

With the fingerprint card selection apparatus 50 described above, since not only characteristics which are used in an ordinary apparatus but also characteristics obtained from a joint line are utilized, the characteristic space is expanded comparing with that of the ordinary apparatus which does not make use of a joint line, and preselection of cards higher in reliability and selectivity can be achieved.

Figure 12:
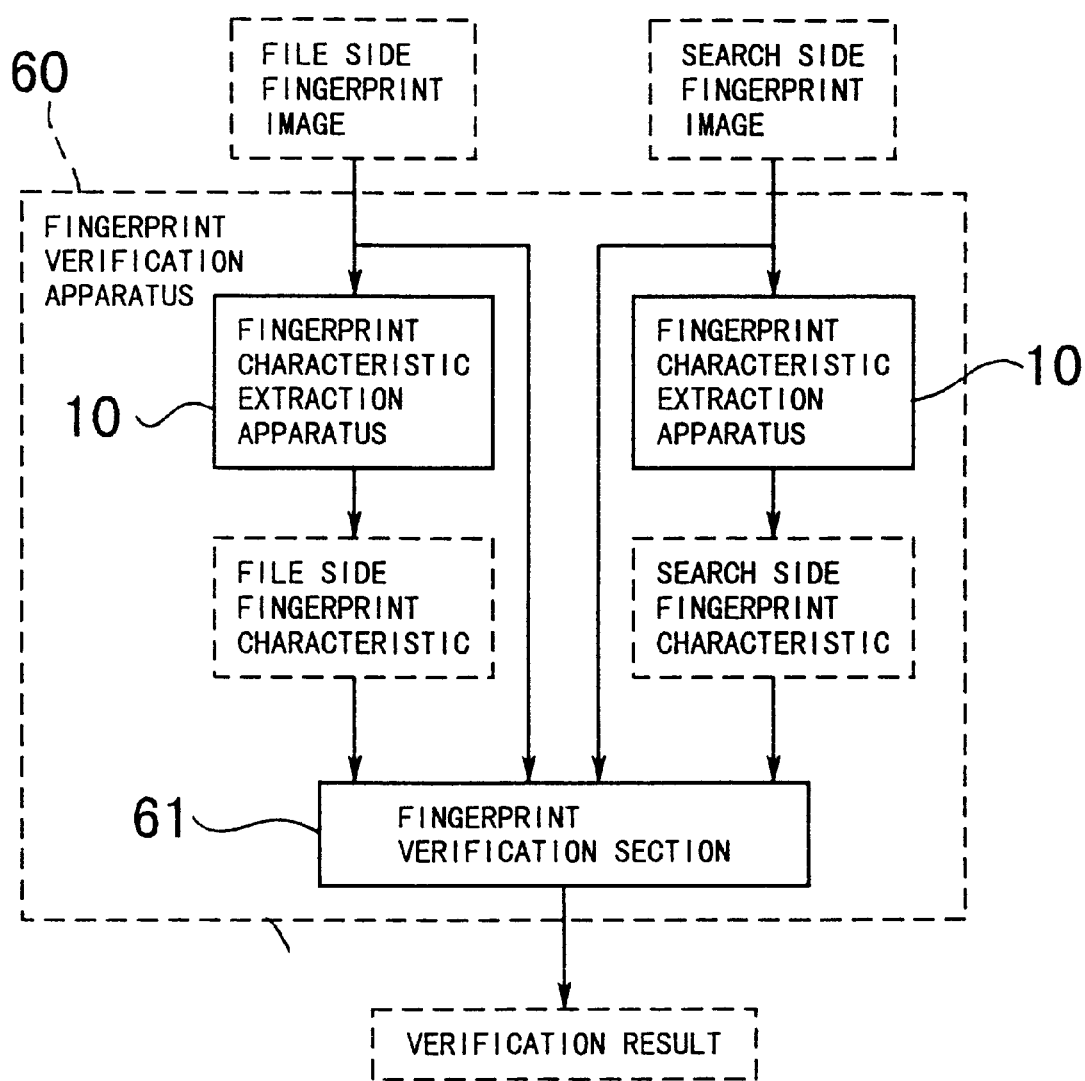
FIG. 12 is a block diagram of a fingerprint verification apparatus to which the present invention is applied.

Subsequently, a fingerprint verification apparatus to which the present invention is applied will be described with reference to FIG. 12. The fingerprint verification apparatus is denoted at 60 and includes a pair of such fingerprint characteristic extraction apparatus 10 as described hereinabove with reference to FIG. 1. The fingerprint verification apparatus 60 evaluates the identity between a file side fingerprint image and a search side fingerprint image using characteristics extracted by the two fingerprint characteristic extraction apparatus 10 to discriminate whether or not the two fingerprints have been collected from the same person.

In particular, the fingerprint characteristic extraction apparatus 10 individually extract characteristic amounts as described above from a file side fingerprint image and a search side fingerprint image and outputs the extracted characteristic amounts to a fingerprint verification section 61. The fingerprint verification section 61 performs verification and discrimination from the inputted fingerprint images making use of minutiae. In this instance, the fingerprint verification section 61 performs comparison also with regard to the characteristic amounts from the two fingerprint characteristic extraction apparatus 10 to effect verification and discrimination including also a result of the comparison. It is to be noted that, for the fingerprint verification section 61, a fingerprint identification apparatus disclosed, for example, in Japanese Patent Publication Application No. Showa 63-13226 or 63-34508 may be used.

By using a characteristic amount extracted by the fingerprint characteristic extraction apparatus 10 for verification discrimination in addition to an ordinary verification discrimination based on minutiae in this manner, the characteristic space is expanded comparing with that of an ordinary fingerprint verification apparatus, and verification with a higher degree of accuracy can be achieved.

Figure 7:
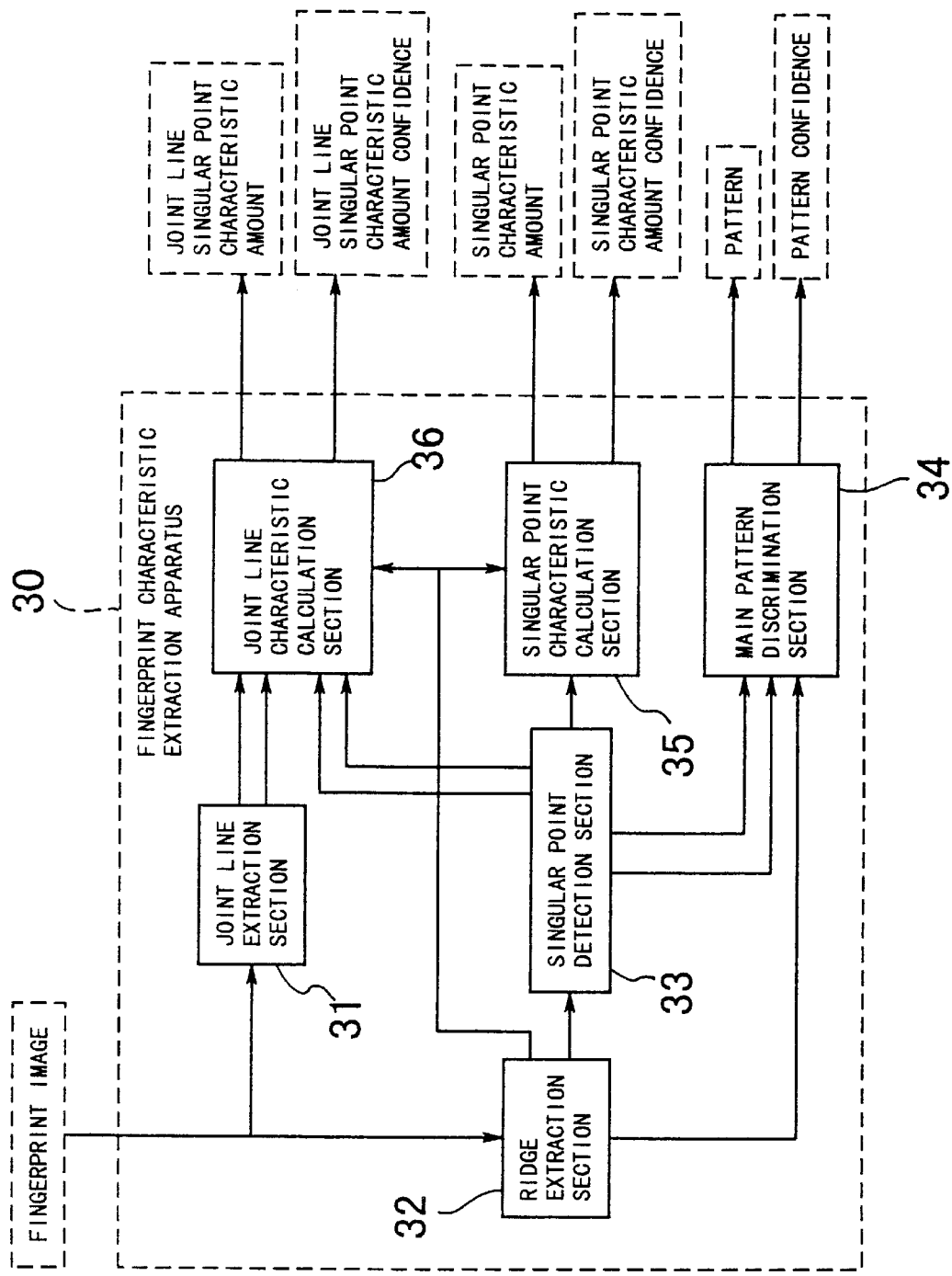
FIG. 7 is a block diagram of another fingerprint characteristic extraction apparatus to which the present invention is applied.

It is to be noted that, while the fingerprint classification apparatus, fingerprint card selection apparatus and fingerprint verification apparatus described above include the fingerprint characteristic extraction apparatus of FIG. 1, they may otherwise include the fingerprint characteristic extraction apparatus of FIG. 7. In this instance, differences of characteristic amounts and confidences are suitably combined and used as criteria in classification or verification of two fingerprint images (or card selection).

Having now fully described the invention, it will be apparent to one of ordinary skill in the art that many changes and modifications can be made thereto without departing from the spirit and scope of the invention as set forth herein.

What is claimed is:

1. A fingerprint characteristic extraction apparatus for extracting a characteristic from a fingerprint image inputted thereto, comprising:
   joint line extraction means for detecting a position of a joint line from the inputted fingerprint image, including the joint line comprising a straight line which is most approximate to a first nodal line;
   singular point detection means for detecting a position of a singular point from the fingerprint image, the singular point detection means detecting a core and a delta of the fingerprint image; and
   joint line characteristic calculation means for calculating a characteristic amount from the position of the joint line and the positions of the core and delta, an angle between a line interconnecting the core and the delta and the joint line.

2. A fingerprint characteristic extraction apparatus as claimed in claim 1, wherein said joint line characteristic calculation means calculates, as the characteristic amount, a distance between the singular point and the joint line.

3. A fingerprint characteristic extraction apparatus as claimed in claim 2, wherein the singular point or points are one or both of a core singular point and a delta singular point.

4. A fingerprint characteristic extraction apparatus as claimed in claim 1, wherein, where the inputted fingerprint image has two singular points, said joint line characteristic calculation means calculates, as the characteristic amount, an angle formed between a straight line interconnecting the two singular points and the joint line.

5. A fingerprint characteristic extraction apparatus as claimed in claim 4, wherein the singular point or points are one or both of a core singular point and a delta singular point.

6. A fingerprint characteristic extraction apparatus as claimed in claim 1, wherein, where the inputted fingerprint image has two singular points, said joint line characteristic calculation means calculates, as the characteristic amount, a distance between feet of perpendiculars drawn from the two singular points to the joint line.

7. A fingerprint characteristic extraction apparatus as claimed in claim 6, wherein the singular point or points are one or both of a core singular point and a delta singular point.

8. A fingerprint characteristic extraction apparatus as claimed in claim 1, wherein said joint line characteristic calculation means detects a number of ridges crossing with a perpendicular drawn from the singular point to the joint line.

9. A fingerprint characteristic extraction apparatus as claimed in claim 8, wherein the singular point or points are one or both of a core singular point and a delta singular point.

10. A fingerprint characteristic extraction apparatus as claimed in claim 1, wherein the singular point or points are one or both of a core singular point and a delta singular point.

11. A fingerprint characteristic extraction apparatus as claimed in claim 1, wherein said joint line characteristic calculation means additionally calculates a confidence of the characteristic amount calculated thereby.

12. A fingerprint classification apparatus for discriminating whether or not two fingerprint images inputted thereto are similar to each other, comprising:

joint line extraction means for extracting positions of joint lines from the inputted fingerprint images, the joint line comprising a straight line which is most approximate to a first nodal line;

singular point detection means for detecting positions of singular points of fingerprints from the fingerprint image, the singular point detection means detecting a core and a delta of the fingerprint images;

joint line characteristic calculation means for calculating characteristic amounts from the positions of the joint lines and the positions of the core and delta of each fingerprint image including an angle between a line interconnecting the core and the delta and the joint line; and fingerprint classification means for discriminating based on the characteristic amounts whether or not the two fingerprint images are similar to each other.

13. A fingerprint card preselection apparatus for selecting, from among a plurality of file side fingerprint cards on which fingerprints are imprinted, those on which fingerprints similar to fingerprints impressed on a search side fingerprint card are impressed, comprising:

imaging means for acquiring fingerprint images from the file side fingerprint cards and the search side fingerprint card;

joint line extraction means for extracting positions of joint lines from the fingerprint images, the joint line comprising a straight line which is most approximate to a first nodal line;

singular point detection means for detecting positions of singular points of the fingerprints from the fingerprint images, the singular point detection means detecting a core and a delta of the fingerprint images;

joint line characteristic calculation means for calculating characteristic amounts from the positions of the joint lines and the positions of the core and delta of each fingerprint image including an angle between a line interconnecting the core and the delta and the joint line; and card selection discrimination means for selecting, based on the characteristic amounts from among the file side fingerprint cards, those on which fingerprints similar to the fingerprints impressed on the search side fingerprint card are impressed.

14. A fingerprint verification apparatus for discriminating whether or not two fingerprint images imputed thereto originate from fingerprints of a same person, comprising:

joint line extraction means for detecting positions of joint lines from the inputted fingerprint images, the joint line comprising a straight line which is most approximate to a first nodal line;

singular point detection means for detecting positions of singular points of fingerprints from the fingerprint images, the singular point detection means detecting a core and a delta of the fingerprint images;

joint line characteristic calculation means for calculating characteristic amounts from the positions of the joint lines and the positions of the core and delta of each fingerprint image including an angle between a line interconnecting the core and the delta and the joint line; and fingerprint verification means for discriminating based on the characteristic amounts whether or not the two fingerprint images originate from a same person.

* * * * *